(12) United States Patent
Georgis et al.

(10) Patent No.: US 9,417,969 B2
(45) Date of Patent: Aug. 16, 2016

(54) DISTRIBUTED NETWORK BACKUP OF MULTIMEDIA FILES

(75) Inventors: Nikolaos Georgis, San Diego, CA (US); Fredrik Carpio, San Diego, CA (US); Paul Hwang, San Diego, CA (US)

(73) Assignee: Sony Corporation, Tokyo (JP)

(*) Notice: Subject to any disclaimer, the term of this patent is extended or adjusted under 35 U.S.C. 154(b) by 388 days.

(21) Appl. No.: 12/779,506

(22) Filed: May 13, 2010

(65) Prior Publication Data

US 2011/0282840 A1  Nov. 17, 2011

(51) Int. Cl.
*G06F 17/30* (2006.01)
*G06F 11/14* (2006.01)

(52) U.S. Cl.
CPC ........ *G06F 11/1448* (2013.01); *G06F 11/1456* (2013.01); *G06F 11/1464* (2013.01)

(58) Field of Classification Search
USPC .............................. 707/652, 674, E17.01, 647
See application file for complete search history.

(56) References Cited

U.S. PATENT DOCUMENTS

| | | | |
|---|---|---|---|
| 6,249,877 B1* | 6/2001 | Kawakami et al. | 714/6.1 |
| 6,785,768 B2 | 8/2004 | Peters et al. | |
| 7,389,038 B1 | 6/2008 | Watanabe et al. | |
| 7,650,341 B1* | 1/2010 | Oratovsky et al. | 707/999.01 |
| 8,265,154 B2* | 9/2012 | Gardner | 375/240.14 |
| 2003/0014419 A1* | 1/2003 | Clapper | 707/101 |
| 2003/0217330 A1* | 11/2003 | Shelley | 715/501.1 |
| 2005/0144283 A1 | 6/2005 | Fatula, Jr. | |
| 2007/0030528 A1 | 2/2007 | Quaeler et al. | |
| 2007/0089151 A1* | 4/2007 | Moore et al. | 725/132 |
| 2008/0005334 A1* | 1/2008 | Utard et al. | 709/226 |
| 2008/0147821 A1 | 6/2008 | Dietrich et al. | |
| 2008/0240533 A1* | 10/2008 | Piron et al. | 382/131 |
| 2008/0307019 A1* | 12/2008 | Weiss et al. | 707/204 |
| 2008/0307107 A1* | 12/2008 | Chen et al. | 709/231 |
| 2009/0154559 A1 | 6/2009 | Gardner | |
| 2009/0210427 A1 | 8/2009 | Eider et al. | |
| 2009/0210614 A1* | 8/2009 | Gorobets | 711/103 |
| 2009/0234856 A1* | 9/2009 | Miloushev et al. | 707/8 |
| 2009/0240743 A1 | 9/2009 | Yamagami | |
| 2009/0271412 A1* | 10/2009 | Lacapra et al. | 707/10 |
| 2010/0030827 A1* | 2/2010 | Sarakas | 707/204 |
| 2010/0049753 A1* | 2/2010 | Prahlad et al. | 707/204 |
| 2010/0094921 A1 | 4/2010 | Roy et al. | |
| 2010/0125507 A1* | 5/2010 | Tarantino et al. | 705/14.69 |

(Continued)

FOREIGN PATENT DOCUMENTS

WO  01/15083 A1  3/2001

OTHER PUBLICATIONS

Yiu, W.-P.K.; Xing Jin; Chan, S.-H.G., "VMesh: Distributed Segment Storage for Peer-to-Peer Interactive Video Streaming," Selected Areas in Communications, IEEE Journal on , vol. 25, No. 9, pp. 1717,1731, Dec. 2007.*

(Continued)

*Primary Examiner* — Syed Hasan
(74) *Attorney, Agent, or Firm* — Chip Law Group

(57) ABSTRACT

Each of plural multimedia files desired to be backed up are transformed into vector representations and divided into segments, and the segments are sent to respective participating computers in a network as a means of backing up the files. The multimedia files can be recovered and may be reconstituted with less than 100% of the segments with minimal deleterious noticeability upon subsequent display of the content in the files.

20 Claims, 2 Drawing Sheets recovery UI

(56) References Cited

U.S. PATENT DOCUMENTS

2010/0257142 A1  10/2010  Murphy et al.
2011/0302161 A1* 12/2011  Walker et al. ................. 707/723

OTHER PUBLICATIONS

Chao-Tung Yang, Chuan-Lin Lai, Chin-Ming Chi, Kuan-Ching Li; "On Utilization of the Grid Computing Technology for Video Conversion", Int. Computer Sumposium, Dec. 15-17, 2004, Taipei, Taiwan—http://dspace.lib.fcu.edu.tw/bitstream/2377/1863/1/ce07ics002004000181.pdf.

Jianfeng Xu Yamasaki, T.Aizawa, K.; "Motion Editing in 3D Video Database", IEEExplore, Jun. 14-16, 2006, http://ieexplore.ieee.org/serach/freesrchabstract.jsp?tp=4155763&queryText%3Donline+backup+segment_vector+grid%26openRefinements%3D*%26serachField%3DSearch+All.

* cited by examiner

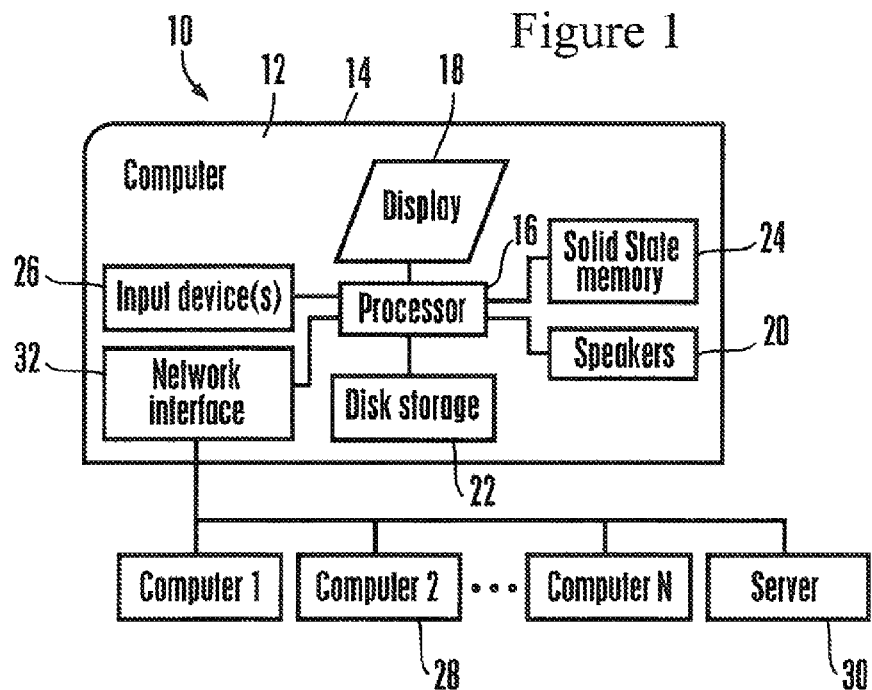
Figure 1
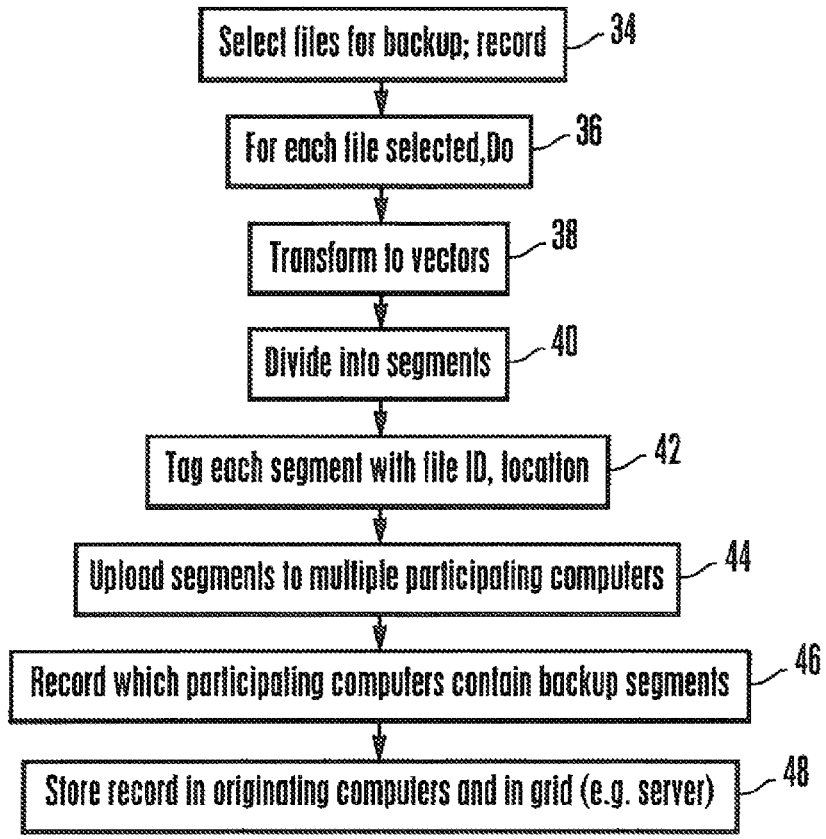
Figure 2 backup logic

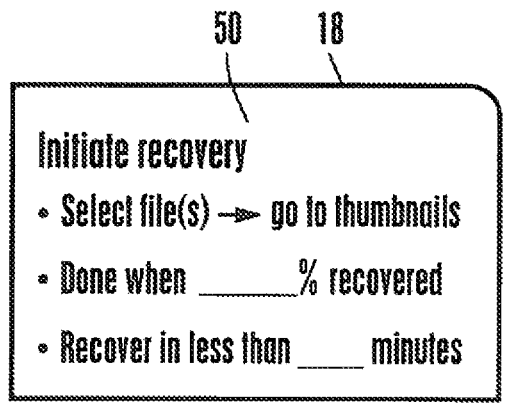
Figure 3  recovery UI
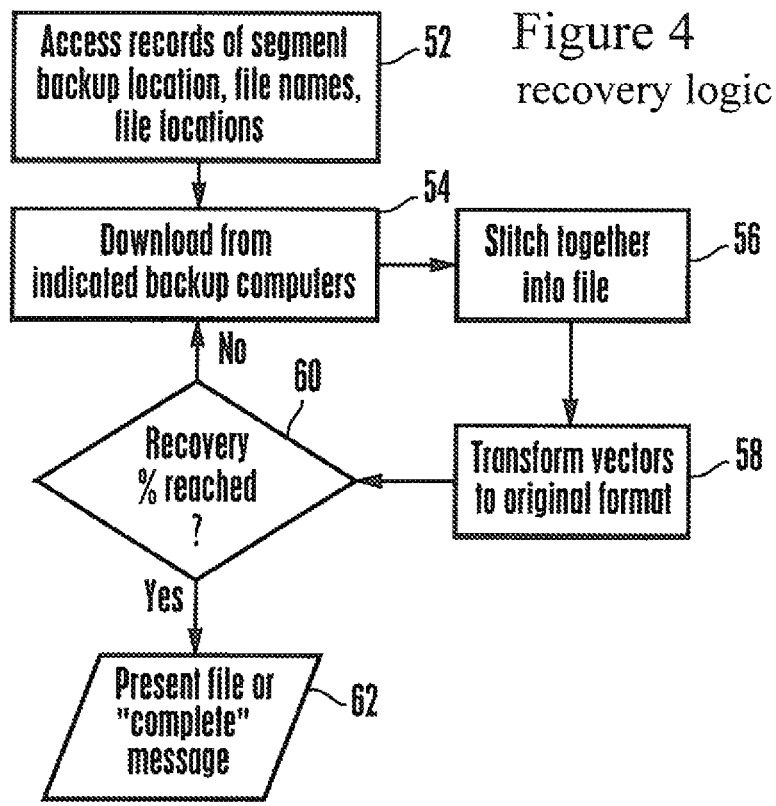
Figure 4 recovery logic

DISTRIBUTED NETWORK BACKUP OF MULTIMEDIA FILES

FIELD OF THE INVENTION

The present application relates generally to distributed network backup of multimedia files.

BACKGROUND OF THE INVENTION

Multimedia files such as digital images, videos and music typically represent 90% or more of the data that is stored on the disk drive a typical personal computer. As understood herein, methods exist for backing up personal multimedia files but most them are expensive and require user effort and knowledge on how to execute. Even worse, some of the backup mechanisms still entail significant risk. For example, backing up personal videos to a second drive on the same PC is risky if the PC is stolen. Backing up the files to a set of DVDs is risky in the case of a fire, and backing up to a single on-line backup service can be expensive and can also be risky should the on-line backup company go out of business.

As also understood herein, it is not always necessary to have an exact copy of a multimedia file be available as a backup copy, because even if 5%-10% of the pixels in a backup photograph are different from the original, for instance, it is unlikely that a significant difference will be apparent to a casual viewer. Likewise, it can be difficult to discern the difference between an original video and a backup version of that video that is missing a relatively small percentage of the original frames.

SUMMARY OF THE INVENTION

Accordingly, a computer includes a housing, a processor in the housing, and a non-transitory computer readable storage medium in the housing and accessible by the processor to execute logic. The logic causes the processor to divide a multimedia file into plural segments and to tag each segment with an identification indicating the file to which the segment belongs. The logic causes the processor to send the segments to respective participating backup computers in a computer network so that the segments of the file are distributed among multiple backup computers.

If desired, each segment can also be tagged with an indication of its location within its file. In example embodiments, the logic includes transforming the file into vectors, with the segments being composed of the vectors. The file can be transformed into vectors prior to dividing the file into the segments. Further, the logic may include recording which participating computers receive which segments to generate a location record that can be provided to a network server for access thereat in the event that the location record cannot be accessed in data storage of the computer. If desired, a user can establish an acceptable file percentage for recovery of the file, such that the file is indicated as being fully recovered when sufficient segments have been recovered to meet the acceptable file percentage. The acceptable file percentage can be less than 100%.

In another aspect, a computer includes a housing, a processor in the housing, and a non-transitory computer readable storage medium in the housing and accessible by the processor to execute logic. The logic causes the processor to receive a recovery command to recover a multimedia file having segments stored in plural participating computers and to communicate with the computers to download the segments. The processor stitches the segments together using identification tags accompanying the segments to reconstruct the multimedia file to at least an acceptable percentage of an original version of the multimedia file. The acceptable percentage can be less than 100%.

In another aspect, a method includes designating a multimedia file to be backed up, dividing the file into segments, and sending the segments to respective participating computers in a network as a means of backing up the files. The multimedia file is recovered by downloading at least some segments from the participating computers. The method includes reconstituting the multimedia file with less than 100% of the segments with minimal deleterious noticeability upon subsequent display of content in the file.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart of example logic for providing backing up multimedia files;

FIG. 3 is a screen shot of an example file recovery user interface (UI); and

FIG. 4 is a flow chart of example logic for recovering backed up multimedia files.

DETAILED DESCRIPTION OF THE PREFERRED EMBODIMENT

Referring initially to FIG. 1, a system 10 is shown that includes an originating computer 12 such as a laptop or notebook computer, a PC, or a personal digital assistant that in turn typically has portable lightweight plastic housing 14 bearing a digital processor 16. The processor 16 can control a visual display 18 and an audible display 20 such as one or more speakers to present thereon multimedia content from multimedia files such as video files, digital photograph files, and music files.

To undertake present principles, the processor 16 may access one or more computer readable storage media such as but not limited to a disk drive 22 and solid state memory 24 which may be implemented by flash memory, dynamic random access memory (DRAM), etc. In example non-limiting embodiments, the media may store various software modules, including, for example, a module bearing logic executable by the processor to undertake present principles. User input may be received from one or more input devices 26 such as keypads, mice, trackballs, joysticks, voice recognition mechanisms, etc.

Also, the processor 16 communicates with multiple other computers 28 and optionally with an Internet server 30 using a network communications interface 32, such as a wired or wireless modem or telephone transceiver. The computers 12, 26 may each execute portions of the logic herein and the server 28 likewise may execute certain portions such as the below-described logic.

Accordingly and now turning to block 34 of FIG. 2, the multimedia files to be backed up are selected/designated as such. The user may enter a command to backup files by directory, by individual file name, by file folder, etc. Alternatively, the processor 16 may periodically automatically select files for backup based on manufacturer rules, user-defined backup rules, etc. In any case, the names of the files to be backed up may be recorded.

If desired, a thumbnail image for each file to be backed up may be generated using, e.g., the first frame of a video or a reduced version of a digital photo. The thumbnails may be stored on the disk drive 22 and/or sent to the server 30. In this way, a user later can access the thumbnails to recall which files were backed up and to aid in selecting a file for restoration from a backed up copy according to logic below.

At block 36, for each multimedia file selected for backup, in example embodiments the logic may move to block 38 to transform the file into a format suitable for segmenting. In one example, the pixels of an image frame may be transformed from the spatial domain to a hyperspace parameterized set of vectors. The transformation may be effected using a Fourier transform, for example, to transform spatial locations of pixels into the frequency domain. Or, a singular value decomposition (SVD) transform may be used, or other suitable transform.

Proceeding to block 40, the output of the transform step at block 38 is divided into multiple segments. For example, the file may be divided into twenty of fifty or a hundred or more segments. At block 42 each segment is tagged with the identification of the file to which it belongs and its location within that file.

As understood herein, dividing the file after transformation permits less noticeable degradation upon recovery in the event that some parts of the signal cannot be recovered. As an example, if a song is divided into multiple parts without transforming it, and some parts subsequently cannot be recovered, the resulting audio quality on playback would be noticeably degraded, with clicks and pops. On the other hand, if (in one example) a Fourier transform is applied to the song and then the frequency components are divided into parts, some of the parts can be unrecoverable yet the song reconstructed after reception and inverse transformation with less noticeable degradation.

Moving to block 44, the segments with identifying tags are uploaded through the network interface 32 to respective participating computers 28. Thus, to illustrate, the first segment of a file with its tag may be uploaded to "computer 1" in FIG. 1, the second segment with tag to "computer 2", and so on. The segments may be assigned a participating computer for storage using a round robin assignation technique, randomly, or otherwise. While a participating computer may contain more than one segment of a particular file, it is preferred to minimize the number of segments from any one file that a single participating computer 28 backs up, so that in the event the participating computer is unavailable during subsequent restoration, the consequent adverse impact on the file is minimized.

Block 46 indicates that a record is maintained of which participating computers 28 contain which multimedia file segments from the originating computer 12. At block 48 this record is stored in the originating computer 12 and if desired in the server 30 or other secondary location so that if the originating computer 12 is lost, stolen, or inoperative, a user can still recover multimedia files using the record in the server 30, which, recall from block 34, may also receive from the originating computer the thumbnails or other record of which original files on the originating computer 12 were backed up.

FIGS. 3 and 4 illustrate how a multimedia file may be recovered from the backed up copy. An example recovery user interface (UI) 50 is shown in FIG. 3 that can be presented on the display 18 to permit a user certain options for recovering a multimedia file from a backed-up copy. As shown, the user may select a file to be recovered by entering the file name, or may choose to recover an entire directory or folder by entering the directory or folder name. Or, the user may click on the "go to thumbnails" option, which will cause the thumbnails generated at block 34 in FIG. 2 to be presented for selection of one or more underlying files for recovery by means of clicking on the associated thumbnail.

Also, in some embodiments the user may be given the option of deciding how much of the file is acceptable for recovery purposes in terms of, e.g., percentage. For example, the user can enter "95%" in the field shown to indicate that recovery of 95% of the file will be considered acceptable. If more than the indicated percentage can be recovered within a threshold period of time, e.g., within thirty minutes after the indicated percentage is recovered, then an even greater percentage of the file is returned. The user may be given the option of establishing the threshold period, or it may be set by default.

In contrast, if less than the indicated percentage of the file can be recovered within a recovery period that may be user-established or set by default, an error may be returned, and/or a prompt presented on the display inquiring whether the user would like to lower the acceptable percentage and indicating to the user how much of the file has in fact been recovered to that point.

In this way, for instance, should one or more of the participating computers 28 be unavailable at time of recovery, if enough segments can be recovered to meet the user's threshold percentage, the system can still provide the user with a recovered file. A default recovery percentage may be implemented and may be changed by the user or in some cases may not be changeable. Or, as can be appreciated in reference to FIG. 3, the user can insist on recovering 100% of the file no matter how long it takes.

In any case, once the desired files to be recovered have been established, at block 52 in FIG. 4 the records associated with that file are accessed to ascertain which participating computers 28 to query for segments and to ascertain the files and file positions with which each recovered segment is associated. Using this information, at block 54 the requisite segments are downloaded from the indicated participating backup computers 28 and stitched together at block 56 using the segment tags. If a transform was conducted during backup in FIG. 2, at block 58 in FIG. 4 the reverse transform is executed to convert the files back to their original format.

Decision diamond 60 indicates that the above process continues until the acceptable recovery percentage has been reached. When that occurs the file is presented and/or a "recovery complete" message is presented on the originating computer 12 at state 62.

If desired, additional services can be provided by using grid computing techniques. For example, the participating computers 28 can enhance or transcode the parameterized multimedia content. The additional services that can be provided using grid computing technologies may be, without limitation, transcoding a video file to a different video format or enhancing images for better quality. Such algorithms may be re-implemented to run on the parameterized space after the transformation to take advantage of the power of grid computing in that all devices that participate in the grid can store segments of files as well as process them according to the instructions received by the owner.

While the particular DISTRIBUTED NETWORK BACKUP OF MULTIMEDIA FILES is herein shown and described in detail, it is to be understood that the subject matter which is encompassed by the present invention is limited only by the claims.

What is claimed is:

1. A computer comprising:
one or more processors operable to:
select, at predefined intervals, a multimedia file to be backed up bases on a plurality of predefined rules;
transform the selected multimedia file into vectors;
divide the transformed multimedia file into a plurality of segments;
tag each of the plurality of segments with an identification indicating the multimedia file to which each of the plurality of segments belongs; and
send each of the plurality of segments to a respective participating backup computer in a computer network such that the plurality of segments of the multimedia file are distributed among a plurality of participating computers,
wherein a first input is received from a user to establish an acceptable file percentage for recovery of the multimedia file,
wherein a second input is received from the user to receive a threshold period of time for the recovery of the multimedia file, and
wherein, in an event a percentage corresponding to a number of the plurality of segments recovered within the threshold period of time is equal or more than the acceptable file percentage, the multimedia file is indicated as being fully recovered, the acceptable file percentage being less than 100%.

2. The computer of claim 1, wherein each of the plurality segments is tagged with an indication of a location of the segment within the multimedia file.

3. The computer of claim 1, wherein the one or more processors are operable to transform the multimedia file into vectors, the plurality of segments being composed of the vectors.

4. The computer of claim 3, wherein the multimedia file is transformed into the vectors prior to dividing the multimedia file into the plurality of segments.

5. The computer of claim 1, wherein the one or more processors are operable to record which participating backup computer receives which segment of the plurality of segments to generate a location record.

6. The computer of claim 5, wherein the location record is provided to a network server for access in an event that the location record cannot be accessed in the computer.

7. The computer of claim 1, wherein in an event the percentage of the received number of plurality of segments corresponding to the multimedia file for recovery is less than the first input received for the established acceptable file percentage, a third input is received from the user to receive another acceptable file percentage,
wherein the another acceptable file percentage is less than the first input of the acceptable file percentage, and
wherein, in an event the percentage of the number of plurality of segments recovered within the threshold period of time is equal or more than the another acceptable file percentage, the multimedia file is indicated as being fully recovered.

8. A computer comprising:
one or more processors operable to:
automatically select, at predefined intervals, a multimedia file to be backed up based on a plurality of predefined rules;
receive a recovery command to recover the multimedia file after being backed up, the multimedia file having a plurality of segments stored on a plurality of participating computers,
wherein the recovery command includes information corresponding to:
an acceptable file percentage for recovery of the multimedia file as a first input, and
a threshold period of time for the recovery of the multimedia file as a second input;
communicate with the plurality of participating computers to download the plurality of segments; and
combine the plurality of segments using identification tags associated with each of the plurality of segments to reconstruct the multimedia file to the acceptable file percentage of an original version of the multimedia file, the acceptable file percentage being less than 100%, wherein, in an event a percentage corresponding to a number of the plurality of segments recovered within the threshold period of time is equal or more than the acceptable file percentage, the multimedia file is indicated as being fully recovered.

9. The computer of claim 8, wherein the plurality of segments are backed up as the vectors and the one or more processors are operable to transform the vectors to the original version of the multimedia file.

10. The computer of claim 8, wherein the one or more processors are operable to present thumbnail images on a display of the computer, each thumbnail image representing a respective multimedia file, and generate a command to recover the multimedia file associated with the thumbnail selected by a user.

11. The computer of claim 8, wherein the one or more processors are operable to receive a third input from a user corresponding to a path name to designate the multimedia file for recovery.

12. The computer of claim 8, wherein the one or more processors are operable to:
tag each of the plurality of segments with the identification tags indicating the multimedia file to which each of the plurality of segments belongs; and
send each of the plurality of segments to a respective participating backup computer in a computer network such that the plurality of segments of the multimedia file are distributed among multiple backup computers.

13. The computer of claim 8, wherein each of the plurality of segments is tagged with an indication of a location of the segment within the multimedia file.

14. The computer of claim 8, wherein the one or more processor are operable to transform the multimedia file into vectors, the plurality of segments being composed of the vectors.

15. The computer of claim 14, wherein the multimedia file is transformed into the vectors prior to dividing the multimedia file into the plurality of segments.

16. The computer of claim 8, wherein the one or more processors are operable to record which participating computer receives which segment of the plurality of segments to generate a location record.

17. The computer of claim 16, wherein the location record is provided to a network server for access in an event that the location record cannot be accessed in the computer.

18. The computer of claim 8, wherein the multimedia file comprises at least one of video file, digital image file and audio file.

19. A method comprising:

automatically designating, at predefined intervals, a multimedia file to be backed up based on a plurality of predefined rules;

transforming the multimedia file into vectors;

dividing the transformed multimedia file into a plurality of segments;

sending the plurality of segments to respective participating computers in a network for backing up the multimedia file;

recovering the multimedia file by downloading the plurality of segments from the participating computers, wherein a first input is received from a user to establish an acceptable file percentage for recovery of the multimedia file, wherein a second input is received from the user to receive a threshold period of time for the recovery of the multimedia file, and wherein, in an event a percentage corresponding to a number of plurality of segments recovered within the threshold period of time is equal or more than the acceptable file percentage, the multimedia file is indicated as being fully recovered; and reconstituting the multimedia file with less than 100% of the plurality of segments.

20. The method of claim 19, further comprising transforming the multimedia file into vector representations.

\* \* \* \* \*